US012627989B2

(12) United States Patent
Cong et al.

(10) Patent No.: US 12,627,989 B2
(45) Date of Patent: May 12, 2026

(54) CHANNEL ALLOCATION METHOD AND RELATED APPARATUS

(71) Applicant: HUAWEI TECHNOLOGIES CO., LTD., Shenzhen (CN)

(72) Inventors: Shanya Cong, Suzhou (CN); Chongyu Niu, Suzhou (CN); Jun Zhan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 18/192,803

(22) Filed: Mar. 30, 2023

(65) Prior Publication Data
US 2023/0319580 A1 Oct. 5, 2023

(30) Foreign Application Priority Data
Mar. 31, 2022 (CN) .......................... 202210334394.9

(51) Int. Cl.
*H04W 16/10* (2009.01)
*H04W 16/06* (2009.01)
*H04W 72/541* (2023.01)

(52) U.S. Cl.
CPC ........... *H04W 16/10* (2013.01); *H04W 16/06* (2013.01); *H04W 72/541* (2023.01)

(58) Field of Classification Search
None
See application file for complete search history.

(56) References Cited

U.S. PATENT DOCUMENTS

| | | | | |
|---|---|---|---|---|
| 5,933,420 A | * | 8/1999 | Jaszewski | H04W 16/14 370/329 |
| 2003/0040319 A1 | * | 2/2003 | Hansen | H04W 16/10 455/450 |
| 2010/0008316 A1 | * | 1/2010 | Liu | H04W 72/541 370/252 |

FOREIGN PATENT DOCUMENTS

CN 112839362 A 5/2021

OTHER PUBLICATIONS

IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amendment 1: Radio Resource Measurement of Wireless LANs. IEEE Std 802.11K™—Jun. 12, 2008. total 244 pages.
(Continued)

*Primary Examiner* — Jamaal Henson

(57) ABSTRACT
A channel allocation method and a related apparatus are disclosed. The method is for reducing a quantity of access points with to-be-switched channels and reducing an amount of calculation for channel switching. The method includes: obtaining interference degrees of a plurality of access points; and performing partial channel allocation based on the interference degrees. The partial channel allocation includes: retaining an operating channel of an access point in a first access point set, and reallocating an operating channel to an access point in a second access point set. The first access point set includes an access point with an interference degree lower than a target degree in the plurality of access points, and the second access point set includes an access point with an interference degree reaching the target degree in the plurality of access points.

18 Claims, 8 Drawing Sheets

(56) References Cited

OTHER PUBLICATIONS

Kunxiao Zhou et al: "Partially overlapping channel assignment for WLANs using SINR interference model", International Journal of Communication Systems, Wiley, Chichester, GB, vol. 27, No. 11, Mar. 5, 2013 (Mar. 5, 2013) , pp. 3082-3095 XP071993891, ISSN: 1074-5351, DOI: 10.1002/DAC.2527.
Extended European Search Report issued in EP23163476.7, dated Sep. 1, 2023, 5 pages.

* cited by examiner

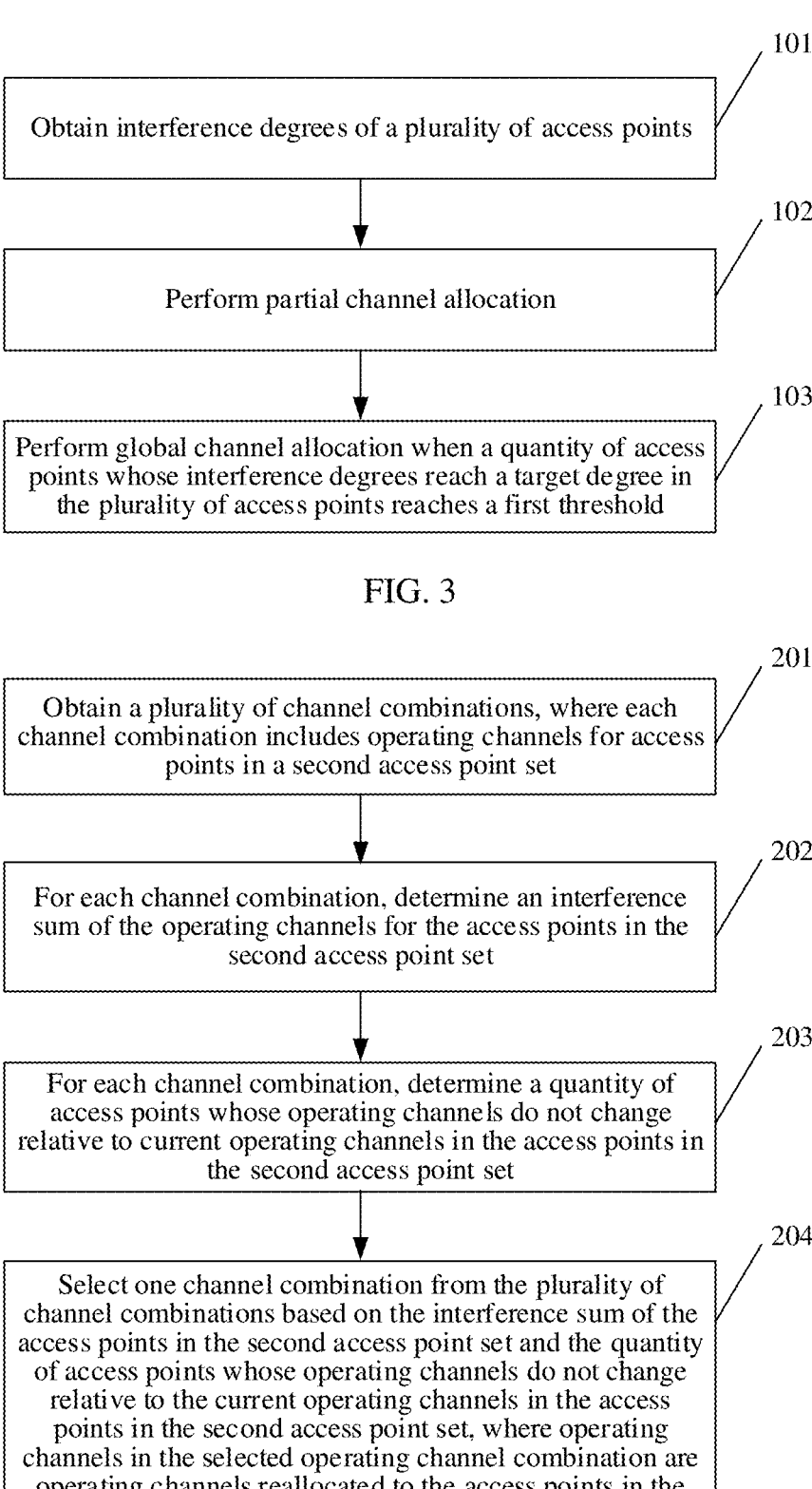

101

Obtain interference degrees of a plurality of access points

102

Perform partial channel allocation

103

Perform global channel allocation when a quantity of access points whose interference degrees reach a target degree in the plurality of access points reaches a first threshold

Obtain a plurality of channel combinations, where each channel combination includes operating channels for access points in a second access point set

202

For each channel combination, determine an interference sum of the operating channels for the access points in the second access point set

203

For each channel combination, determine a quantity of access points whose operating channels do not change relative to current operating channels in the access points in the second access point set

204

Select one channel combination from the plurality of channel combinations based on the interference sum of the access points in the second access point set and the quantity of access points whose operating channels do not change relative to the current operating channels in the access points in the second access point set, where operating channels in the selected operating channel combination are operating channels reallocated to the access points in the second access point set

FIG. 4

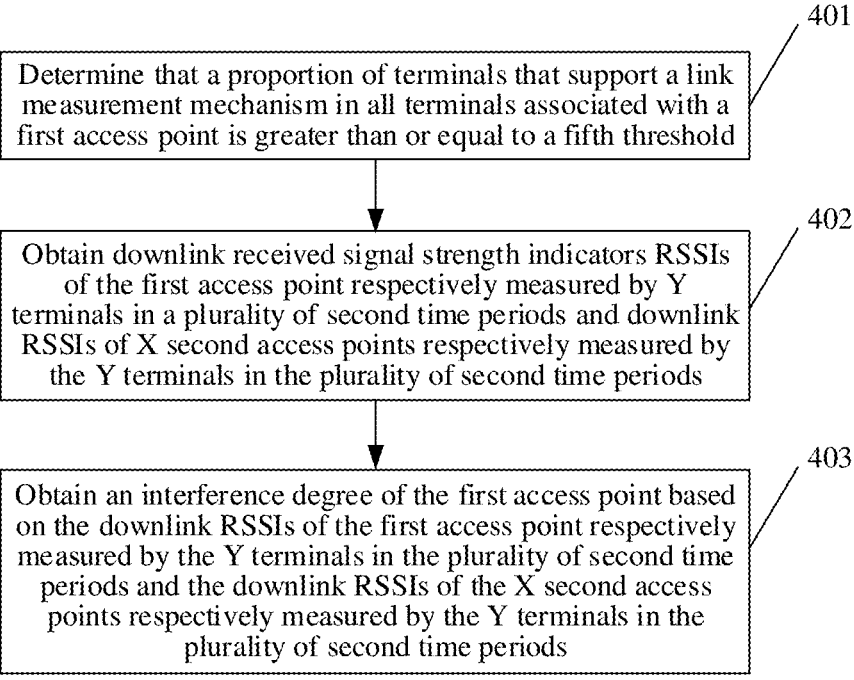

401

Determine that a proportion of terminals that support a link measurement mechanism in all terminals associated with a first access point is greater than or equal to a fifth threshold

402

Obtain downlink received signal strength indicators RSSIs of the first access point respectively measured by Y terminals in a plurality of second time periods and downlink RSSIs of X second access points respectively measured by the Y terminals in the plurality of second time periods

403

Obtain an interference degree of the first access point based on the downlink RSSIs of the first access point respectively measured by the Y terminals in the plurality of second time periods and the downlink RSSIs of the X second access points respectively measured by the Y terminals in the plurality of second time periods

FIG. 8

CHANNEL ALLOCATION METHOD AND RELATED APPARATUS

CROSS-REFERENCE TO RELATED APPLICATION

This application claims priority to Chinese Patent Application No. 202210334394.9, filed on Mar. 31, 2022. The aforementioned patent application is hereby incorporated by reference in its entirety.

TECHNICAL FIELD

The present disclosure relates to the field of communication technologies, and in particular, to a channel allocation method and a related apparatus.

BACKGROUND

With development of wireless technologies, wireless local area networks (WLANs) are widely used in scenarios such as homes, hospitals, enterprise office, and industrial production.

In large-scale scenarios such as hospitals, enterprise office, and industrial production, massive access points (APs) need to be deployed for unified coverage of the wireless local area networks. After the access points are deployed, a channel needs to be allocated to each access point. Generally, different channels are allocated to neighboring access points.

When a quantity of access points needs to be increased or decreased, channels of a large quantity of access points need to be switched, resulting in a large amount of calculation.

SUMMARY

The present disclosure provides a channel allocation method and a related apparatus. The method can reduce a quantity of access points whose channels are to be switched and reduce an amount of calculation for channel switching.

According to a first aspect, the present disclosure provides a channel allocation method, including:

obtaining interference degrees of a plurality of access points; and performing partial channel allocation. The interference degree may be represented in a plurality of manners. This is not specifically limited in embodiments of the present disclosure. For example, the interference degree may be represented by channel utilization and own channel utilization. For another example, the interference degree may be represented by a signal to interference ratio (SIR) or a signal to interference plus noise ratio (SINR), where the signal to interference plus noise ratio may also be referred to as a signal to noise ratio for short. The partial channel allocation includes: retaining an operating channel of an access point in a first access point set, and reallocating an operating channel to an access point in a second access point set. The first access point set includes an access point whose interference degree is lower than a target degree in the plurality of access points, and the second access point set includes an access point whose interference degree reaches the target degree in the plurality of access points. After the operating channel is reallocated, an operating channel of the access point in the second access point set may change, in other words, the reallocated operating channel is different from the current operating channel; or an operating channel of the access point in the second access point set may not change, in other words, the reallocated operating channel is the same as the current operating channel. In a process of performing partial channel allocation, a plurality of methods may be specifically used to reallocate the operating channel to the access point in the second access point set. For example, a dynamic channel allocation (DCA) technology is used to reallocate the operating channel to the access point. There are a plurality of types of dynamic channel allocation technologies. In embodiments of the present disclosure, the dynamic channel allocation technology may be a Cisco dynamic channel allocation technology, or may be an Aruba dynamic channel allocation technology.

The present disclosure ensures that the operating channel of the access point in the first access point set remains unchanged. Therefore, a quantity of access points whose channels are to be switched can be reduced, thereby reducing an amount of calculation for channel switching.

In an implementation, the performing partial channel allocation includes: performing partial channel allocation when a quantity of access points whose interference degrees reach the target degree in the plurality of access points is less than a first threshold. The first threshold may be set based on an actual case. For example, the first threshold may be set to 25% or 30%.

If the quantity of access points whose interference degrees reach the target degree in the plurality of access points is less than the first threshold, it indicates that interference between the plurality of access points is weak. Therefore, the partial channel allocation may be performed, so that the quantity of access points whose channels are to be switched can be reduced.

In an implementation, the obtaining interference degrees of a plurality of access points includes: obtaining channel utilization and own channel utilization of a first access point in a plurality of first time periods, where the first access point is any one of the plurality of access points, and the first time period may be adjusted based on an actual requirement, for example, the first time period may be five minutes; and obtaining an interference degree of the first access point based on the channel utilization and the own channel utilization of the first access point in the plurality of first time periods.

In an implementation, the obtaining an interference degree of the first access point based on the channel utilization and the own channel utilization of the first access point in the plurality of first time periods includes: calculating co-channel interference ratios of the first access point in the plurality of first time periods based on the channel utilization and the own channel utilization of the first access point in the plurality of first time periods, where the co-channel interference ratio is a first ratio of a co-channel interference rate to the channel utilization, and the co-channel interference rate is a difference between the channel utilization and the own channel utilization; and obtaining a second ratio of a quantity of first time periods in which the co-channel interference ratio is greater than a second threshold to a total quantity of the first time periods, where the second ratio represents the interference degree of the first access point. The second threshold may be set based on an actual requirement. In embodiments of the present disclosure, the second threshold may be set to 0.5.

In an implementation, the interference degree is represented by the signal to interference ratio or the signal to interference plus noise ratio. When the interference degree is the signal to interference ratio, the signal to interference ratio may be measured by the access point, or may be measured by a terminal associated with the access point. Similarly, when the interference degree is the signal to interference plus noise ratio, the signal to interference ratio may be measured by the access point, or may be measured by the terminal associated with the access point.

In an implementation, the reallocating an operating channel to an access point in a second access point set includes: reallocating the operating channel to the access point in the second access point set when a quantity of access points whose operating channels do not change after the operating channel reallocation in the second access point set is considered.

Because the quantity of access points whose operating channels do not change after the operating channel reallocation in the second access point set is considered, it may be ensured that the access point whose operating channel does not change also exists in the access points in the second access point set, so that the quantity of access points whose channels are to be switched can be further reduced, to reduce the amount of calculation for channel switching.

In an implementation, the reallocating the operating channel to the access point in the second access point set when a quantity of access points whose operating channels do not change after the operating channel reallocation in the second access point set is considered includes: obtaining a plurality of channel combinations, where each channel combination includes operating channels for the plurality of access points; for each channel combination, determining a co-channel interference sum of the operating channels for the plurality of access points; for each channel combination, determining a quantity of access points whose operating channels do not change relative to current operating channels in the plurality of access points; and selecting one channel combination from the plurality of channel combinations based on the interference sum of the access points in the second access point set and the quantity of access points whose operating channels do not change relative to the current operating channels in the access points in the second access point set, where operating channels in the selected operating channel combination are operating channels reallocated to the access points in the second access point set.

The operating channels are reallocated to the access points in the second access point set based on the interference sum of the access points in the second access point set and the quantity of access points whose operating channels do not change relative to the current operating channels in the access points in the second access point set. This can reduce interference between the access points and reduce the quantity of access points whose channels are to be switched.

In an implementation, the obtaining interference degrees of a plurality of access points includes: obtaining downlink received signal strength indicators RSSIs of a first access point respectively measured by Y terminals in a plurality of second time periods and downlink RSSIs of X second access points respectively measured by the Y terminals in the plurality of second time periods, where the first access point is any one of K access points, the Y terminals are associated with the first access point, the second access point is an access point in a neighbor relationship with the first access point in the K access points, and a current operating channel of the second access point is the same as a current operating channel of the first access point, where X and Y are positive integers; and obtaining an interference degree of the first access point based on the downlink RSSIs of the first access point respectively measured by the Y terminals in the plurality of second time periods and the downlink RSSIs of the X second access points respectively measured by the Y terminals in the plurality of second time periods.

In an implementation, the obtaining an interference degree of the first access point based on the downlink RSSIs of the first access point respectively measured by the Y terminals in the plurality of second time periods and the downlink RSSIs of the X second access points respectively measured by the Y terminals in the plurality of second time periods includes: calculating downlink signal to noise ratios of the Y terminals in the plurality of second time periods based on the downlink RSSIs of the first access point respectively measured by the Y terminals in the plurality of second time periods and the downlink RSSIs of the X second access points respectively measured by the Y terminals in the plurality of second time periods, where a downlink signal to noise ratio of a terminal in each second time period is a ratio of a downlink RSSI of the first access point measured by the terminal in the second time period to a downlink RSSI sum, and the downlink RSSI sum is a sum of the downlink RSSI of the first access point measured by the terminal in the second time period and a downlink RSSI of the X second access points measured by the terminal in the second time period; obtaining a third ratio of a quantity of terminals whose downlink signal to noise ratios are greater than a third threshold in each second time period to the quantity Y of the terminals; and obtaining a fourth ratio of a quantity of second time periods in which the third ratio is greater than a fourth threshold to a total quantity of the second time periods, where the fourth ratio represents the interference degree of the first access point.

In an implementation, before the obtaining downlink received signal strength indicators RSSIs of a first access point respectively measured by Y terminals in a plurality of second time periods and downlink RSSIs of X second access points respectively measured by the Y terminals in the plurality of second time periods, the method further includes: determining that a proportion of terminals that support a link measurement mechanism in all terminals associated with the first access point is greater than or equal to a fifth threshold, where the terminal that supports the link measurement mechanism is configured to measure the downlink RSSI.

The interference degree is determined based on the downlink RSSI, and the downlink RSSI is measured by the terminal that supports the link measurement (LM) mechanism. Therefore, the determining that a proportion of terminals that support a link measurement mechanism in all terminals associated with the first access point is greater than or equal to a fifth threshold can ensure that the proportion of terminals that support the link measurement mechanism in all the terminals associated with the first access point is large enough, thereby ensuring that the interference degree determined based on the downlink RSSI is valid and accurate.

In an implementation, the method further includes: performing global channel allocation when the quantity of access points whose interference degrees reach the target degree in the plurality of access points reaches the first threshold, where the global channel allocation includes reallocating operating channels to the plurality of access points.

When the quantity of access points whose interference degrees reach the target degree in the plurality of access points reaches the first threshold, the global channel allocation is performed, so that a degree of interference between the plurality of access points can be reduced, to avoid an excessively high degree of interference between the plurality of access points, and avoid impact on experience of a terminal associated with the access point.

According to a second aspect, the present disclosure provides a channel allocation apparatus, including: an obtaining unit, configured to obtain interference degrees of a plurality of access points; and an allocation unit, configured to perform partial channel allocation. The partial channel allocation includes: retaining an operating channel of an access point in a first access point set, and reallocating an operating channel to an access point in a second access point set, where the first access point set includes an access point whose interference degree is lower than a target degree in the plurality of access points, and the second access point set includes an access point whose interference degree reaches the target degree in the plurality of access points.

In an implementation, the allocation unit is configured to perform partial channel allocation when a quantity of access points whose interference degrees reach the target degree in the plurality of access points is less than a first threshold.

In an implementation, the obtaining unit is configured to: obtain channel utilization and own channel utilization of a first access point in a plurality of first time periods, where the first access point is any one of the plurality of access points; and obtain an interference degree of the first access point based on the channel utilization and the own channel utilization of the first access point in the plurality of first time periods.

In an implementation, the obtaining unit is configured to: calculate co-channel interference ratios of the first access point in the plurality of first time periods based on the channel utilization and the own channel utilization of the first access point in the plurality of first time periods, where the co-channel interference ratio is a first ratio of a co-channel interference rate to the channel utilization, and the co-channel interference rate is a difference between the channel utilization and the own channel utilization; and obtain a second ratio of a quantity of first time periods in which the co-channel interference ratio is greater than a second threshold to a total quantity of the first time periods, where the second ratio represents the interference degree of the first access point.

In an implementation, the interference degree is represented by a signal to interference ratio or a signal to interference plus noise ratio.

In an implementation, the allocation unit is configured to reallocate the operating channel to the access point in the second access point set when a quantity of access points whose operating channels do not change after the operating channel reallocation in the second access point set is considered.

In an implementation, the allocation unit is further configured to perform global channel allocation when the quantity of access points whose interference degrees reach the target degree in the plurality of access points reaches the first threshold, where the global channel allocation includes reallocating operating channels to the plurality of access points.

According to a third aspect, the present disclosure provides a control device, where the control device includes a memory and a processor. The processor is configured to execute a computer program or instructions stored in the memory, to enable the control device to perform the method according to any implementation of the first aspect.

According to a fourth aspect, the present disclosure provides a computer-readable storage medium, where the computer-readable storage medium has program instructions. When the program instructions are directly or indirectly executed, the method according to any implementation of the first aspect is implemented.

According to a fifth aspect, the present disclosure provides a chip system, where the chip system includes at least one processor. The processor is configured to execute a computer program or instructions stored in a memory. When the computer program or the instructions are executed in the at least one processor, the method according to any implementation of the first aspect is implemented.

According to a sixth aspect, the present disclosure provides a computer program product, where the product includes instructions. When the instructions are run on a computer, the computer is enabled to perform the method according to any implementation of the first aspect.

BRIEF DESCRIPTION OF DRAWINGS

FIG. 3 is a schematic diagram of a first embodiment of a channel allocation method according to embodiments of the present disclosure;

FIG. 4 is a schematic flowchart of allocating an operating channel based on two parameters according to an embodiment of the present disclosure;

FIG. 8 is a schematic diagram of a second embodiment of obtaining an interference degree of an access point;

DESCRIPTION OF EMBODIMENTS

The following clearly describes technical solutions in embodiments of the present disclosure with reference to the accompanying drawings in embodiments of the present disclosure. It is clear that the described embodiments are merely some but not all of embodiments of the present disclosure. All other embodiments obtained by a person skilled in the art based on embodiments of the present disclosure without creative efforts shall fall within the protection scope of the present disclosure.

In the specification, claims, and accompanying drawings of the present disclosure, the terms "first", "second", and the like are intended to distinguish between similar objects but do not necessarily indicate a specific order or sequence. It can be understood that the terms used in such a way are interchangeable in proper circumstances, which is merely a discrimination manner that is used when objects having a same attribute are described in embodiments of the present disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

In descriptions of the present disclosure, "/" means "or" unless otherwise specified. For example, A/B may represent A or B. In the present disclosure, "and/or" describes only an association relationship between associated objects and represents that any one of three relationships may exist. For example, A and/or B may represent one of the following three cases: Only A exists, both A and B exist, and only B exists. In addition, in the descriptions of the present disclosure, "at least one" means one or more, and "a plurality of" means two or more. "At least one item (piece) of the following" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural.

Embodiments of the present disclosure may be applied to a wireless local area network (WLAN). The wireless local area network includes a plurality of access points (APs) and a plurality of controllers, each controller is configured to control one or more access points, and each access point may be accessed by a plurality of terminals. The controller may also be referred to as a wireless controller or a WLAN controller.

Figure 1:
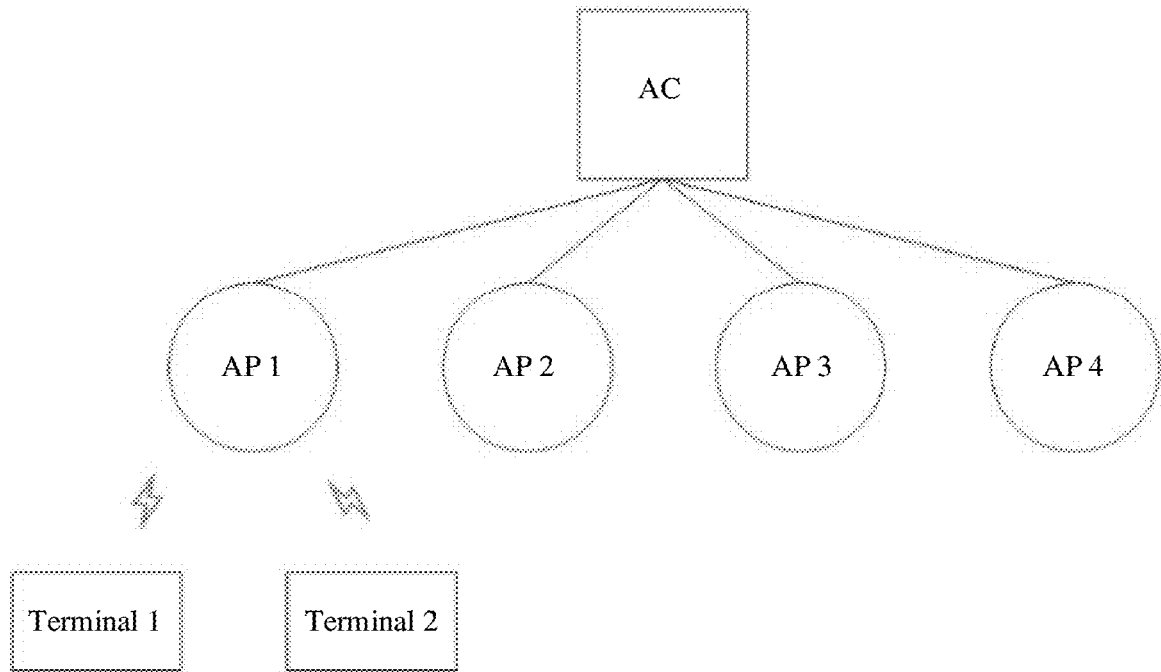
FIG. 1 is a schematic diagram of an embodiment of a wireless local area network according to embodiments of the present disclosure.

A wireless local area network shown in FIG. 1 is used as an example. The wireless local area network includes one controller and four access points (an access point 1, an access point 2, an access point 3, and an access point 4), and the four access points are controlled by the same controller. The access point 1 is accessed by two terminals (a terminal 1 and a terminal 2), and is connected to and communicates with the two terminals via a link.

A type of the terminal is not specifically limited in embodiments of the present disclosure. For example, the terminal may be a mobile phone, a personal computer, a tablet computer, a smart wearable device (for example, a smartwatch or a smart band), or a smart appliance (for example, a motor or a rice cooker).

A controller allocates a channel to an access point controlled by the controller, and data may be transmitted, through the allocated channel, between the access point and a terminal that accesses the access point. A channel, also known as a frequency band, is a data signal transmission channel that uses a radio signal as a transmission medium. Generally, the controller allocates different channels to neighboring access points. For example, in FIG. 1, the four access points are neighboring to each other, and channels of the four access points are different from each other.

In a running process of a wireless local area network, there is a case in which a quantity of access points is increased or decreased. When the quantity of access points needs to be increased or decreased, according to an existing method, channels of a large quantity of access points are switched, resulting in a large amount of calculation.

Therefore, embodiments of the present disclosure provide a channel allocation method. The method can reduce a quantity of access points whose channels are to be switched, thereby reducing an amount of calculation for channel switching.

In an actual running process of the wireless local area network, a quantity of access points is far greater than the quantity of access points in FIG. 1, but a quantity of channels is limited. Therefore, it is inevitable that neighboring access points have a same channel. This causes interference between the neighboring access points. In embodiments of the present disclosure, interference is generally co-channel interference, and the co-channel interference may be understood as interference caused by a same channel. Details are not described in the following again.

Based on the foregoing case, in the method provided in embodiments of the present disclosure, interference degrees of a plurality of access points are evaluated first, and then partial channel allocation is performed based on the interference degrees of the plurality of access points, to be specific, an operating channel is reallocated only to a part of the access points, and it is ensured that an operating channel of a remaining part of the access points remains unchanged.

Figure 2:
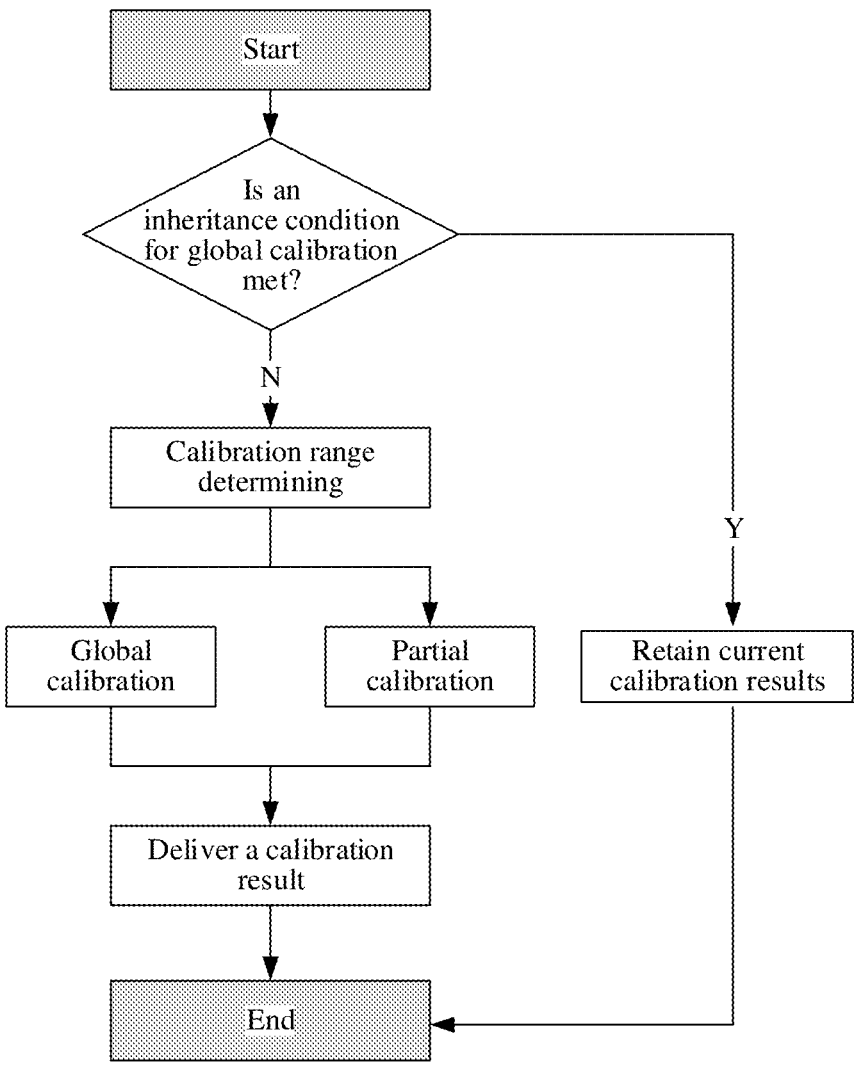
FIG. 2 is an overall schematic diagram of an operating channel allocation method according to an embodiment of the present disclosure.

With reference to FIG. 2, the following briefly describes an operating channel allocation method according to an embodiment of the present disclosure.

As shown in FIG. 2, the operating channel allocation method according to this embodiment includes the following four steps.

Step 1: Perform inheritance condition determining on current calibration results of all access points to determine whether an inheritance condition for global calibration is met; and if the condition is met, retain the current calibration results, to be specific, retain current operating channels of all the access points.

The current calibration result refers to the current operating channel of the access point. It may be determined whether an interference degree of the current operating channel of each access point reaches a target degree, to determine whether the inheritance condition for global calibration is met. When the interference degree of the current operating channel of no access point reaches the target degree, it indicates that the inheritance condition for global calibration is met; otherwise, the inheritance condition for global calibration is not met.

Step 2: If the inheritance condition for global calibration is not met, perform calibration range determining.

A calibration range may be global. To be specific, the calibration range is the operating channels of all the access points. Alternatively, a calibration range may be partial. To be specific, the calibration range is an operating channel of a part of the access points.

Based on the foregoing description, the calibration range determining may include: performing calibration range determining based on a quantity of access points whose interference degrees reach the target degree. Specifically, when a proportion of access points whose interference degrees reach the target degree is large, the calibration range is global; when a proportion of access points whose interference degrees reach the target degree is small, the calibration range is partial (for example, is an operating channel of the access point whose interference degree reaches the target degree).

Step 3: Perform global or partial calibration based on the calibration range obtained through division in the foregoing step.

The calibration may be understood as reallocating an operating channel.

Step 4: Deliver a calibration result to the access points.

For ease of understanding, with reference to FIG. 3, the following further describes the method provided in embodiments of the present disclosure. The method provided in embodiments of the present disclosure may be performed by the controller in FIG. 1.

Specifically, as shown in FIG. 3, the present disclosure provides an embodiment of the channel allocation method. This embodiment includes the following steps.

Step 101: Obtain interference degrees of a plurality of access points.

Generally, the plurality of access points accesses a same controller, so that the same controller allocates channels to the plurality of access points.

There is a plurality of manners of representing the interference degree, and this is not specifically limited in embodiments of the present disclosure. There is also a plurality of implementation methods for step 101 that correspond to the different manners of representing the interference degree.

For example, the interference degree may be represented by channel utilization and own channel utilization.

For another example, the interference degree may be represented by a signal to interference ratio (SIR) or a signal to interference plus noise ratio (SINR), where the signal to interference plus noise ratio may also be referred to as a signal to noise ratio for short.

It is to be noted that, when the interference degree is the signal to interference ratio, the signal to interference ratio may be measured by the access point, or may be measured by a terminal associated with the access point. Similarly, when the interference degree is the signal to interference plus noise ratio, the signal to interference ratio may be measured by the access point, or may be measured by the terminal associated with the access point.

The following describes in detail the implementation method for step 101 for the foregoing two manners of the interference degree.

Step 102: Perform partial channel allocation.

The partial channel allocation includes: retaining an operating channel of an access point in a first access point set, and reallocating an operating channel to an access point in a second access point set. The first access point set includes an access point whose interference degree is lower than a target degree in the plurality of access points, and the second access point set includes an access point whose interference degree reaches the target degree in the plurality of access points.

The target degree is set by using different methods corresponding to the different manners of representing the interference degree. This is described below in detail.

It is to be noted that after the operating channel is reallocated, an operating channel of the access point in the second access point set may change, in other words, the reallocated operating channel is different from the current operating channel; or an operating channel of the access point in the second access point set may not change, in other words, the reallocated operating channel is the same as the current operating channel.

In this embodiment, a corresponding condition may be set for performing step 102. The condition may indicate strength of interference between the plurality of access points.

In an implementation, step 102 includes: performing partial channel allocation when a quantity of access points whose interference degrees reach the target degree in the plurality of access points is less than a first threshold.

The first threshold may be set based on an actual case. For example, the first threshold may be set to 25% or 30%.

If the quantity of access points whose interference degrees reach the target degree in the plurality of access points is less than the first threshold, it indicates that the interference between the plurality of access points is weak. Therefore, the partial channel allocation may be performed.

In a process of performing partial channel allocation, a plurality of methods may be specifically used to reallocate the operating channel to the access point in the second access point set.

For example, a dynamic channel allocation (DCA) technology is used to reallocate the operating channel to the access point.

There is a plurality of types of dynamic channel allocation technologies. In embodiments of the present disclosure, the dynamic channel allocation technology may be a Cisco dynamic channel allocation technology, or may be an Aruba dynamic channel allocation technology.

Step 102 is equivalent to the partial calibration in the embodiment shown in FIG. 2.

Step 103: Perform global channel allocation when the quantity of access points whose interference degrees reach the target degree in the plurality of access points reaches the first threshold.

The global channel allocation includes reallocating operating channels to the plurality of access points.

If the quantity of access points whose interference degrees reach the target degree in the plurality of access points reaches the first threshold, it indicates that the interference between the plurality of access points is strong. Therefore, the global channel allocation may be performed to reduce the interference between the plurality of access points.

In addition, to further reduce the interference between the plurality of access points, bandwidth of a system in which the plurality of access points is located may be adjusted.

Step 103 is equivalent to the global calibration in the embodiment shown in FIG. 2.

In this embodiment, the interference degrees of the plurality of access points are obtained, and then the partial channel allocation is performed. This ensures that the operating channel of the access point in the first access point set remains unchanged. Therefore, a quantity of access points whose channels are to be switched can be reduced, thereby reducing an amount of calculation for channel switching.

In addition, when the quantity of access points whose interference degrees reach the target degree in the plurality of access points reaches the first threshold, the global channel allocation is performed, so that a degree of interference between the plurality of access points can be reduced, to avoid an excessively high degree of interference between the plurality of access points, and avoid impact on experience of the terminal associated with the access point.

The following uses a specific example to compare the channel allocation method provided in embodiments of the present disclosure with the existing channel allocation method.

For example, one controller controls 20 access points, and there are four access points whose interference degrees reach a target degree. A proportion of access points whose interference degrees reach the target degree is 4/20 (namely, 20%).

If channels are reallocated according to the existing channel allocation method, after the channels are reallocated, operating channels of 18 access points change, and operating channels of only two access points remain changed.

If the channel allocation method provided in embodiments of the present disclosure is used, operating channels of 16 access points whose interference degrees do not reach the target degree remain unchanged, and operating channels are reallocated to the four access points whose interference degrees reach the target degree. In this way, after the channels are reallocated, operating channels of the four access points change at most.

It may be learned from this that, compared with the existing channel allocation method, embodiments of the present disclosure can significantly reduce the quantity and a proportion of access points whose operating channels are to be switched, so that more access points can still use current operating channels.

It is to be noted that, after the channel allocation, the access point completes a channel switching operation. However, the channel switching causes an accessing terminal to get disconnected and perform reassociation. This affects experience of the accessing terminal, and especially affects stable and continuous working of an industrial device in an industrial scenario. Therefore, the channel switching is usually performed in a time period in which a quantity of terminals is small. For example, the operating channel of the access point may be switched in the early morning.

It can be learned from the foregoing description that there is a plurality of types of dynamic channel allocation technologies. However, regardless of which dynamic channel allocation technology is used, the channel allocation is performed mainly based on an indicator, namely, an interference sum. The interference sum refers to an accumulated result of interference of all the access points. Because the interference is mainly caused by a same channel, the interference sum is also referred to as a co-channel interference sum.

In embodiments of the present disclosure, impact of a parameter, namely, a quantity of access points whose operating channels do not change after the operating channel reallocation in the second access point set, on the channel allocation may be further considered in addition to the existing dynamic channel allocation technology, to further reduce a proportion of access points whose operating channels change, so that the access points can still use the current operating channels as much as possible.

Specifically, in an implementation, the reallocating an operating channel to an access point in a second access point set includes: reallocating the operating channel to the access point in the second access point set when the quantity of access points whose operating channels do not change after the operating channel reallocation in the second access point set is considered.

In embodiments of the present disclosure, the parameter, namely, the quantity of access points whose operating channels do not change in the second access point set, is also referred to as a channel inheritance index. After the channel inheritance index is added, the channel allocation may be performed based on the channel inheritance index and the interference sum. In addition to the foregoing two parameters, another parameter may also be added based on an actual requirement.

With reference to FIG. 4, the following describes a process of allocating an operating channel based on the foregoing two parameters.

In an implementation, as shown in FIG. 4, the reallocating an operating channel to an access point in a second access point set in step 102 includes the following steps.

Step 201: Obtain a plurality of channel combinations, where each channel combination includes operating channels for the access points in the second access point set.

Step 202: For each channel combination, determine an interference sum of the operating channels for the access points in the second access point set.

Step 203: For each channel combination, determine a quantity of access points whose operating channels do not change relative to current operating channels in the access points in the second access point set.

Step 204: Select one channel combination from the plurality of channel combinations based on the interference sum of the access points in the second access point set and the quantity of access points whose operating channels do not change relative to the current operating channels in the access points in the second access point set, where operating channels in the selected operating channel combination are operating channels reallocated to the access points in the second access point set.

It may be understood that the method provided in embodiments of the present disclosure is for reducing the interference. Therefore, a priority of the parameter, namely, the interference sum, is higher than a priority of the parameter, namely, the channel inheritance index.

Therefore, a few channel combinations may be first selected from the plurality of channel combinations based on the interference sum, and then one channel combination is selected from the few channel combinations based on the channel inheritance index.

The following uses a specific example to describe the foregoing process.

The four access points shown in FIG. 1 are used as an example. A 2.4 GHz frequency band includes a channel 1, a channel 6, and a channel 11. It is assumed that current operating channels of the access point 1, the access point 2, the access point 3, and the access point 4 are respectively the channel 1, the channel 1, the channel 1, and a channel 3.

There are four channel combinations: (the channel 1, the channel 3, the channel 6, the channel 3), (the channel 1, the channel 6, the channel 3, the channel 6), (the channel 3, the channel 3, the channel 3, the channel 6), and (the channel 6, the channel 6, the channel 6, the channel 1).

In a channel reallocation process, the channel combinations (the channel 1, the channel 3, the channel 6, and the channel 3) and (the channel 1, the channel 6, the channel 3, and the channel 6) with small interference sums may be first selected from the foregoing four channel combinations based on the interference sum.

It can be learned through comparison with the current operating channels that, a quantity of access points whose channels do not change in the channel combination (the channel 1, the channel 3, the channel 6, and the channel 3) is 2, and a quantity of access points whose channels do not change in the channel combination (the channel 1, the channel 6, the channel 3, and the channel 6) is 1. Therefore, the channel combination (the channel 1, the channel 3, the channel 6, and the channel 3) may be selected as channels reallocated to the four access points.

It is to be noted that a process of performing global channel allocation in step 103 may be understood with reference to the foregoing process. Details are not described herein again.

The following provides an application example to describe a case in which the newly added channel inheritance index can reduce the proportion of access points whose operating channels are to be switched.

Figure 5:
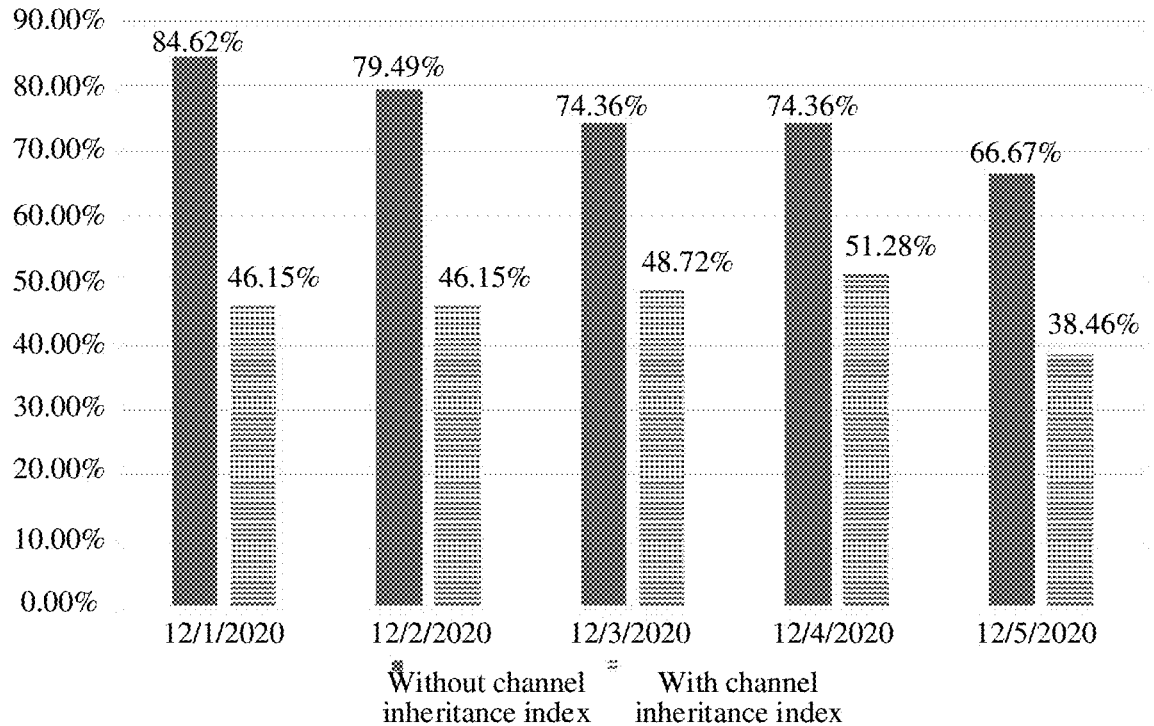
FIG. 5 is a schematic diagram of a first application example according to the present disclosure.

As shown in FIG. 5, for 39 access points, statistics on whole-network proportions that are of access points whose channels are to be switched and that are obtained before and after the channel inheritance index is added are collected, where a horizontal coordinate represents a date, and a vertical coordinate represents the whole-network proportion of access points whose channels are to be switched. It can be learned from FIG. 5 that an average of the whole-network proportion of access points whose channels are to be switched decreases from 75.9% to 30.26% after the channel inheritance index is added.

In addition to reducing the proportion of access points whose operating channels are to be switched, the newly added channel inheritance index can also ensure that a co-channel interference sum on a whole network and a co-channel interference sum of a single access point do not increase.

Figure 6:
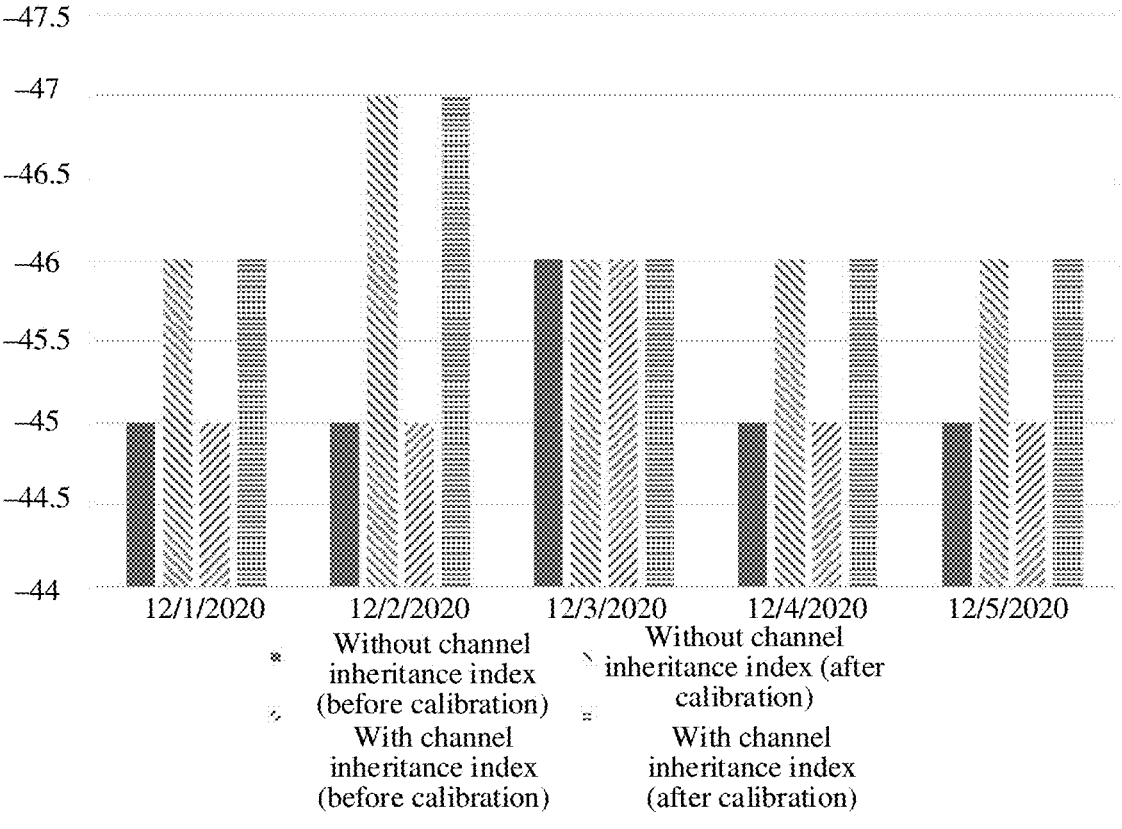
FIG. 6 is a schematic diagram of a second application example according to the present disclosure.

FIG. 6 shows co-channel interference sums in four cases calculated on different dates. The four cases are respectively: There is no channel inheritance index and before calibration is performed; there is no channel inheritance index and after calibration is performed; the channel inheritance index is added and before calibration is performed; and the channel inheritance index is added and after calibration is performed. A horizontal coordinate indicates a date, and a vertical coordinate indicates the co-channel interference sum (unit: dB).

It can be learned from FIG. 6 that, before and after the calibration, adding the channel inheritance index does not cause an increase in the co-channel interference sum. Therefore, adding the channel inheritance index can ensure that the co-channel interference sum on the whole network and the co-channel interference sum of the single access point do not increase. In another implementation, step 203 and step 204 may alternatively be modified. Modified steps are: For each channel combination, determine a quantity of access points whose operating channels change relative to current operating channels in the access points in the second access point set. Select one channel combination from the plurality of channel combinations based on the co-channel interference sum of the access points in the second access point set and the quantity of access points whose operating channels change relative to the current operating channels in the access points in the second access point set, where operating channels in the selected operating channel combination are operating channels reallocated to the access points in the second access point set.

The foregoing describes two manners of representing the interference degree. Specifically, the interference degree may be represented by the channel utilization and the own channel utilization, or may be represented by the signal to interference ratio or the signal to interference plus noise ratio. In addition, a new indicator may alternatively be calculated by using the channel utilization and the own channel utilization, and the new indicator indicates the interference degree. Similarly, another new indicator may alternatively be calculated by using the signal to interference ratio or the signal to interference plus noise ratio, and the another new indicator indicates the interference degree. This is separately described below by using two embodiments.

A first embodiment is as follows.

For a plurality of access points, processes of obtaining interference degrees of the access points may be the same. Therefore, a first access point is used as an example to describe step 101, where the first access point is any one of the plurality of access points.

Figure 7:
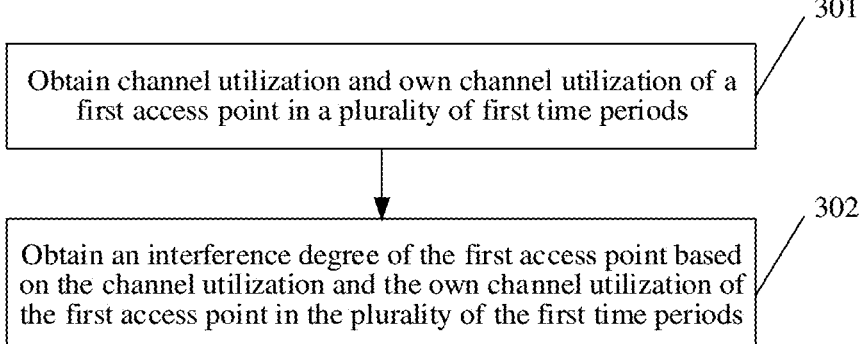
FIG. 7 is a schematic diagram of a first embodiment of obtaining an interference degree of an access point.

Specifically, as shown in FIG. 7, using the first access point as an example, step 101 includes the following steps.

Step 301: Obtain channel utilization and own channel utilization of the first access point in a plurality of first time periods, where the first access point is the any one of the plurality of access points.

There is a plurality of methods for obtaining the channel utilization and the own channel utilization. This is not specifically limited in embodiments of the present disclosure.

In an implementation, the channel utilization is a ratio of target duration to the first time period, where the target duration is a sum of a duration of clear channel assessment of the first access point and a packet transmission duration of the first access point in the first time period; and the own channel utilization is a ratio of the packet transmission duration of the first access point in the first time period to the first time period.

The clear channel assessment means: Receiving is first performed on a current operating channel before data sending. After a given time period, if it is not found that another device is sending data on the current operating channel, the sending starts; or if it is found that another device is sending data, random avoidance is performed for a period of time, and then the process is retried.

The first time period may be adjusted based on an actual requirement. For example, the first time period may be five minutes.

In another implementation, the first access point may report, to a controller at an interval of a statistical periodicity (for example, 10 seconds) less than the first time period, channel utilization and own channel utilization of an operating channel of the first access point in the statistical periodicity, and then the controller calculates channel utilization and own channel utilization of the operating channel in the first time period based on the channel utilization and the own channel utilization that are reported by the first access point.

For example, the first access point reports, every 10 seconds, channel utilization and own channel utilization of the current operating channel in the 10 seconds. Then, the controller calculates channel utilization and own channel utilization of the operating channel in past five minutes based on weights and the reported channel utilization and own channel utilization in every 10 seconds.

Specifically, the channel utilization is used as an example. A product of channel utilization in the first 10 seconds and a first weight is added to a product of channel utilization in the second 10 seconds and a second weight, to obtain first intermediate channel utilization. The first weight and the second weight may be set based on an actual requirement. For example, the first weight may be 0.9, and the second weight may be 0.1.

Then, a product of the first intermediate channel utilization and the first weight is added to a product of channel utilization in the third 10 seconds and the second weight, to obtain second intermediate channel utilization.

The rest can be deduced by analogy. Last intermediate channel utilization that is obtained is the channel utilization of the operating channel of the first access point in the past five minutes.

Step 302: Obtain an interference degree of the first access point based on the channel utilization and the own channel utilization of the first access point in the plurality of first time periods.

There is a plurality of implementations of step 302. This is not specifically limited in this embodiment.

In an implementation, step 302 includes: calculating co-channel interference ratios of the first access point in the plurality of first time periods based on the channel utilization and the own channel utilization of the first access point in the plurality of first time periods, where the co-channel interference ratio is a first ratio of a co-channel interference rate to the channel utilization, and the co-channel interference rate is a difference between the channel utilization and the own channel utilization; and obtaining a second ratio of a quantity of first time periods in which the co-channel interference ratio is greater than a second threshold to a total quantity of the first time periods, where the second ratio represents the interference degree of the first access point.

The co-channel interference ratio is the ratio of the co-channel interference rate to the channel utilization, and may be specifically represented by a formula $$\begin{array}{c}\text{Co--channel}\\ \text{interference ratio}\end{array} = \frac{\begin{array}{c}\text{Co--channel}\\ \text{interference rate}\end{array}}{\begin{array}{c}\text{Channel}\\ \text{utilization}\end{array}} = 1 - \frac{\begin{array}{c}\text{Own channel}\\ \text{utilization}\end{array}}{\begin{array}{c}\text{Channel}\\ \text{ultilization}\end{array}}.$$

The co-channel interference rate is the difference between the channel utilization and the own channel utilization, and may be specifically represented by a formula $$\begin{array}{c}\text{Co--Channel}\\ \text{interference rate}\end{array} = \begin{array}{c}\text{Channel}\\ \text{utilization}\end{array} - \begin{array}{c}\text{Own channel}\\ \text{utilization}\end{array}.$$

In this embodiment, the quantity of first time periods in which the co-channel interference ratio is greater than the second threshold may also be referred to as a co-channel interference channel switching count, and the second ratio may also be referred to as a co-channel interference channel switching ratio. Correspondingly, the second ratio may be represented by a $$\begin{array}{c}\text{Co--channel interference}\\ \text{channel switching ratio}\end{array} = \frac{\begin{array}{c}\text{Co--channel interference}\\ \text{channel switching count}\end{array}}{\text{Total count}} \times 100.$$

The second threshold may be set based on an actual requirement. In embodiments of the present disclosure, the second threshold may be set to 0.5.

It is to be noted that there is a plurality of methods for setting a target degree. This is not specifically limited in embodiments of the present disclosure.

For example, in 24 hours of a day, if a period of time in which the interference degree exceeds the target degree is more than one hour, it indicates that interference is strong, and it is considered that the first access point needs to switch the operating channel.

In view of this, if the first time period is five minutes, 24 hours are equivalent to 288 first time periods, and one hour is equivalent to 12 first time periods. Based on this, that a period of time in which the interference degree exceeds the target degree is more than one hour may be understood as: In the 288 first time periods, if the quantity of first time periods in which the interference ratio exceeds the second threshold reaches 12, the first access point needs to switch the operating channel.

Therefore, the target degree is 12/288. If the second ratio is represented by a percentage, the target degree may be approximately 4.

A second embodiment is as follows.

In the second embodiment, a first access point is still used as an example to describe step 101. This is similar to a case in the first embodiment. The first access point is any one of a plurality of access points.

Specifically, as shown in FIG. 8, the second embodiment includes the following steps.

Step 401: Determine that a proportion of terminals that support a link measurement mechanism in all terminals associated with the first access point is greater than or equal to a fifth threshold, where the terminal that supports the link measurement mechanism is configured to measure a downlink RSSI.

The terminal associated with the first access point may also be understood as a terminal accessing the first access point.

It is to be noted that, in this embodiment, an interference degree is determined based on the downlink RSSI, and the downlink RSSI is measured by the terminal that supports the link measurement (LM) mechanism.

Therefore, to ensure that the interference degree determined based on the downlink RSSI is valid, it needs to first ensure that the proportion of terminals that support the link measurement mechanism in all the terminals associated with the first access point is large enough. Therefore, in this embodiment, step 401 needs to be first performed before the interference degree is calculated.

The fifth threshold may be set based on an actual requirement. For example, the fifth threshold may be 80%.

The proportion of terminals that support the link measurement mechanism in all the terminals associated with the first access point may be obtained based on a quantity of all the terminals associated with the first access point and a quantity of terminals that support the link measurement mechanism. The quantity of all the terminals associated with the first access point and the quantity of terminals that support the link measurement mechanism may be counted by the first access point periodically (where for example, 10 seconds are used as one periodicity).

Specifically, the first access point counts, by using 10 seconds as one periodicity, the quantity of all the terminals associated with the first access point and the quantity of terminals that support the link measurement mechanism. Then, the first access point counts a quantity of all terminals associated with the first access point within 10 minutes and a quantity of terminals that support the link measurement mechanism within the 10 minutes, and reports a statistical result within the 10 minutes to a controller. Then, the controller performs step 401.

It is to be noted that a quantity of terminals that repeatedly appear within 10 minutes is counted as 1.

Step 402: Obtain downlink received signal strength indicators RSSIs of the first access point respectively measured by Y terminals in a plurality of second time periods and downlink RSSIs of X second access points respectively measured by the Y terminals in the plurality of second time periods.

The Y terminals are associated with the first access point, the second access point is an access point that is in a neighbor relationship with the first access point in K access points, and a current operating channel of the second access point is the same as a current operating channel of the first access point, where X and Y are positive integers.

It is to be noted that the neighbor relationship means that an access point can be scanned by another access point. The second time period may be set based on an actual requirement. For example, the second time period is 10 minutes.

Using the terminal 1, the terminal 2, the access point 1, the access point 2, the access point 3, and the access point 4 in FIG. 1 as an example, the access point 1 is in the neighbor relationship with the access point 2, the access point 3, and the access point 4. In addition, operating channels of the access point 1, the access point 2, and the access point 3 are the same.

In this case, step 402 includes: in each of the plurality of second time periods, obtaining downlink RSSIs of the access point 1 measured by the terminal 1 and the terminal 2, downlink RSSIs of the access point 2 measured by the terminal 1 and the terminal 2, and downlink RSSIs of the access point 3 measured by the terminal 1 and the terminal 2.

Step 403: Obtain an interference degree of the first access point based on the downlink RSSIs of the first access point respectively measured by the Y terminals in the plurality of second time periods and the downlink RSSIs of the X second access points respectively measured by the Y terminals in the plurality of second time periods.

In an implementation, step 403 includes:

obtaining downlink signal to noise ratios of the Y terminals in the plurality of second time periods based on the downlink RSSIs of the first access point respectively measured by the Y terminals in the plurality of second time periods and the downlink RSSIs of the X second access points respectively measured by the Y terminals in the plurality of second time periods;

obtaining a third ratio of a quantity of terminals whose downlink signal to noise ratios are greater than a third threshold in each second time period to the quantity Y of terminals; and obtaining a fourth ratio of a quantity of second time periods in which the third ratio is greater than a fourth threshold to a total quantity of second time periods, where the fourth ratio represents the interference degree of the first access point.

A downlink signal to noise ratio of a terminal in each second time period is a ratio of a downlink RSSI of the first access point measured by the terminal in the second time period to a downlink RSSI sum, and may be specifically represented by a formula $$DLSINR_i = \frac{DLRSSI_i}{\sum_{j=1}^{M} DLRSSI_{ij}}.$$

$DLRSSI_i$ represents a downlink RSSI measured by an $i^{th}$ terminal. $DLSINR_i$ represents a downlink signal to noise ratio of the $i^{th}$ terminal in the Y terminals.

$$\sum_{j=2}^{M} DLRSSI_{ij}$$

represents downlink RSSIs of all the second access points measured by the $i^{th}$ terminal. j represents a $j^{th}$ second access point.

The downlink RSSI sum is a sum of the downlink RSSI of the first access point measured by the terminal in the second time period and a downlink RSSI of the X second access points measured by the terminal in the second time period.

Both the third threshold and the fourth threshold may be set based on an actual requirement. For example, the third threshold is 15 dB, and the fourth threshold is 75%.

In embodiments, the signal to noise ratio is short for the signal to interference plus noise ratio (SINR), and is specifically a ratio of strength of a received wanted signal to strength of a received interference signal (noise and interference).

The quantity of second time periods in which the third ratio is greater than the fourth threshold may also be referred to as an SINR channel switching count, and the fourth ratio may also be referred to as a terminal SINR channel switching ratio. Correspondingly, the fourth ratio may be represented by $$\text{Terminal SINR channel switching ratio} = \frac{\text{SINR channel switching count}}{\text{Total count}} \times 100,$$

where a total count in the formula is the total quantity of second time periods.

There is a plurality of methods for setting a target degree. This is not specifically limited in embodiments of the present disclosure. For example, in the second embodiment, the method for setting the target degree is as follows.

Specifically, in 24 hours of a day, if a period of time in which the interference degree exceeds the target degree is more than two hours, it indicates that interference is strong, and it is considered that the first access point needs to switch the operating channel.

If the second time period is 10 minutes, 24 hours are equivalent to 144 second time periods, and two hours are equivalent to 12 second time periods. Based on this, that a period of time in which the interference degree exceeds the target degree is more than two hours may be understood as: In the 144 second time periods, if the quantity of first time periods in which an interference ratio exceeds the fourth threshold reaches 12, the first access point needs to switch the operating channel.

Therefore, the target degree is 12/144. If the fourth ratio is represented by a percentage, the target degree may be approximately 8.

Based on the foregoing description, it can be learned that the second ratio or the fourth ratio may represent the interference degree of the first access point.

During actual application, an interference degree of an access point may be obtained by using a combination of the second ratio and the fourth ratio. Specifically, it is first determined whether the proportion of terminals that support the link measurement mechanism in all the terminals associated with the first access point is large enough. If the proportion is large enough, the fourth ratio indicates the interference degree of the access point; otherwise, the second ratio indicates the interference degree of the access point.

Because the fourth ratio is obtained based on the downlink RSSI measured by the terminal, compared with the second ratio, the fourth ratio can better reflect a status of interference to the terminal. Therefore, in embodiments of the present disclosure, the fourth ratio is preferentially used to indicate the interference degree of the access point.

Figure 9:
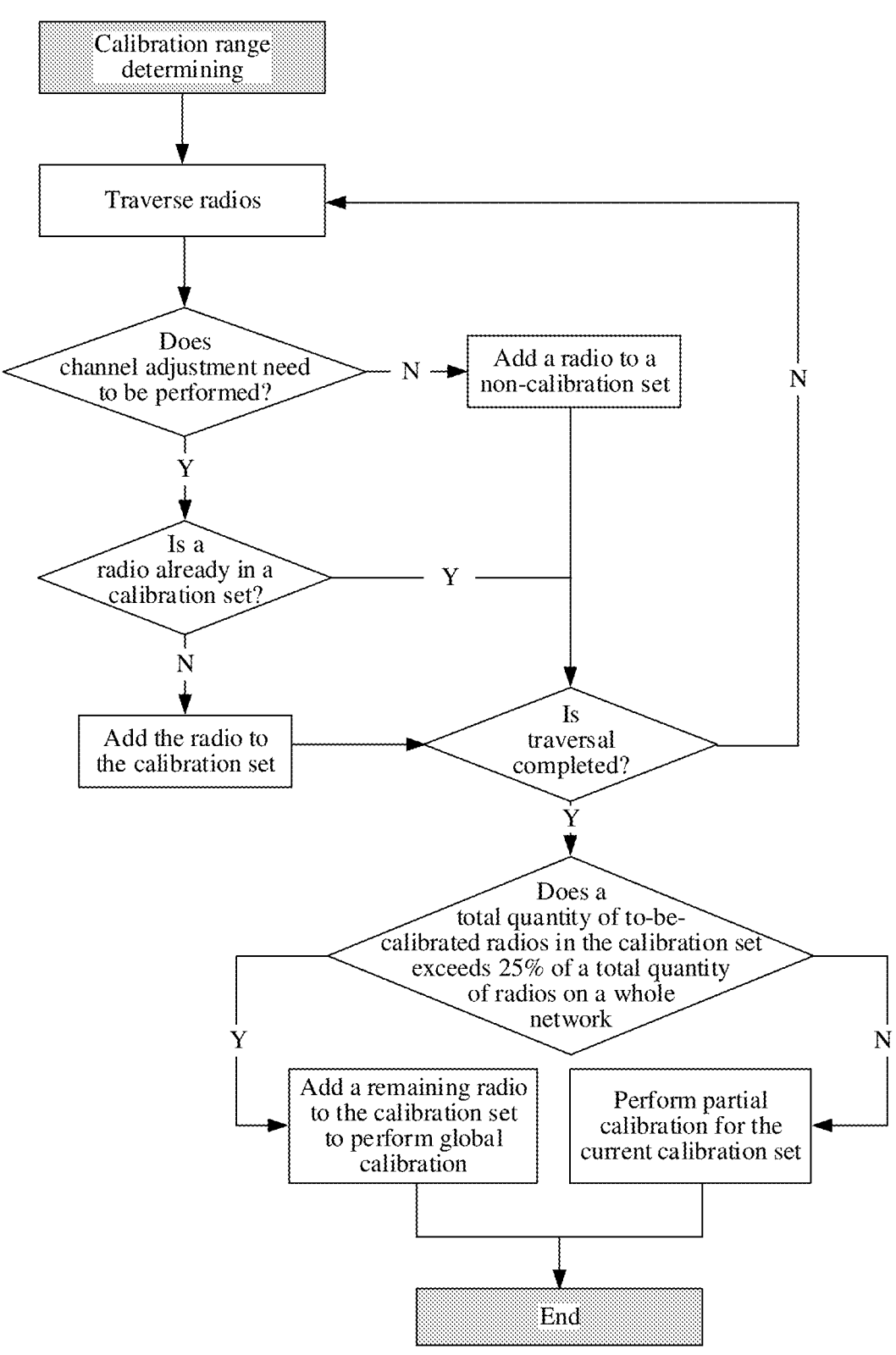
FIG. 9 is a schematic diagram of a second embodiment of a channel allocation method according to embodiments of the present disclosure.

The foregoing describes the channel allocation method provided in embodiments of the present disclosure. Based on the foregoing description, step 2 and step 3 in the embodiment shown in FIG. 2 may be specifically illustrated in FIG. 9. In FIG. 9, a radio represents the foregoing access point.

Specifically, as shown in FIG. 9, radios are first traversed. For each radio, whether channel adjustment needs to be performed on the radio is determined by using the interference degrees obtained in step 101. If the channel adjustment does not need to be performed, the radio is added to a non-calibration set. If the channel adjustment needs to be performed, it is further determined whether the radio is already in a calibration set.

If the radio is not in the calibration set, the radio is added to the calibration set.

After the radio is added to the non-calibration set, after the radio is added to the calibration set, or after it is determined that the radio is already in the calibration set, it is determined whether traversal is completed. If the traversal is not completed, the traversal is continued.

If the traversal is completed, it is determined whether a total quantity of to-be-calibrated radios in the calibration set exceeds 25% (namely, the first threshold described above) of a total quantity of radios on a whole network. If the total quantity of to-be-calibrated radios in the calibration set exceeds 25%, a remaining radio is also added to the calibration set for global calibration (where this is equivalent to step 103). If the total quantity of to-be-calibrated radios in the calibration set does not exceed 25%, partial calibration is performed for the current calibration set (where this is equivalent to step 102).

Finally, channel allocation is completed.

Figure 10:
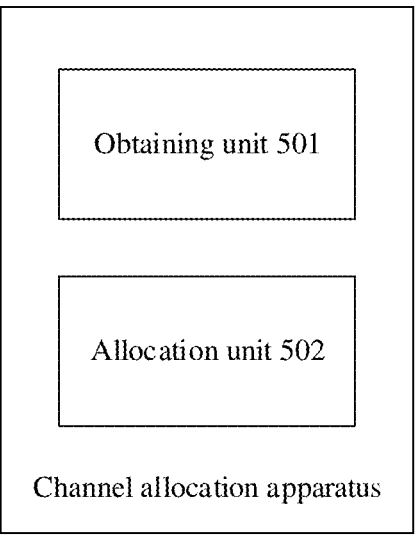
FIG. 10 is a schematic diagram of a structure of a channel allocation apparatus according to an embodiment of the present disclosure.

As shown in FIG. 10, an embodiment of the present disclosure further provides a channel allocation apparatus, including: an obtaining unit 501, configured to obtain interference degrees of a plurality of access points; and an allocation unit 502, configured to perform partial channel allocation. The partial channel allocation includes: retaining an operating channel of an access point in a first access point set, and reallocating an operating channel to an access point in a second access point set, where the first access point set includes an access point whose interference degree is lower than a target degree in the plurality of access points, and the second access point set includes an access point whose interference degree reaches the target degree in the plurality of access points.

In an implementation, the allocation unit 502 is configured to perform partial channel allocation when a quantity of access points whose interference degrees reach the target degree in the plurality of access points is less than a first threshold.

In an implementation, the obtaining unit 501 is configured to: obtain channel utilization and own channel utilization of a first access point in a plurality of first time periods, where the first access point is any one of the plurality of access points; and obtain an interference degree of the first access point based on the channel utilization and the own channel utilization of the first access point in the plurality of first time periods.

In an implementation, the obtaining unit 501 is configured to: calculate co-channel interference ratios of the first access point in the plurality of first time periods based on the channel utilization and the own channel utilization of the first access point in the plurality of first time periods, where the co-channel interference ratio is a first ratio of a co-channel interference rate to the channel utilization, and the co-channel interference rate is a difference between the channel utilization and the own channel utilization; and obtain a second ratio of a quantity of first time periods in which the co-channel interference ratio is greater than a second threshold to a total quantity of the first time periods, where the second ratio represents the interference degree of the first access point.

In an implementation, the interference degree is represented by a signal to interference ratio or a signal to interference plus noise ratio.

In an implementation, the allocation unit 502 is configured to reallocate the operating channel to the access point in the second access point set when a quantity of access points whose operating channels do not change after the operating channel reallocation in the second access point set is considered.

In an implementation, the allocation unit 502 is further configured to perform global channel allocation when the quantity of access points whose interference degrees reach the target degree in the plurality of access points reaches the first threshold, where the global channel allocation includes reallocating operating channels to the plurality of access points.

Figure 11:
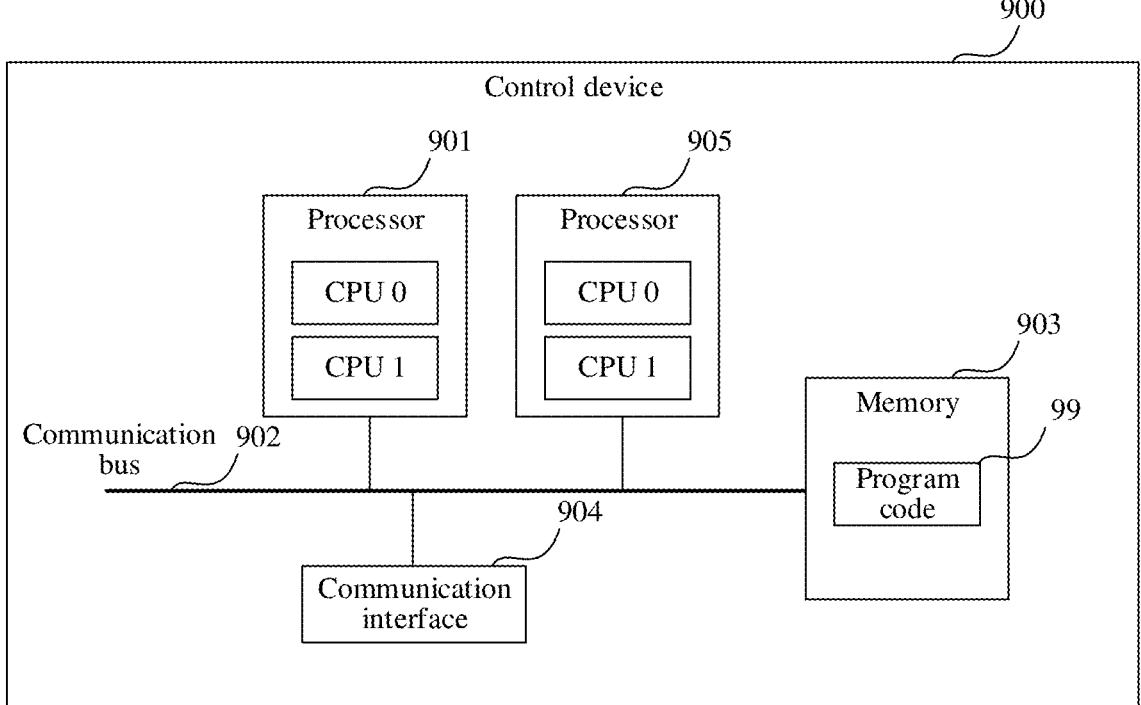
FIG. 11 is a schematic diagram of a structure of a control device according to an embodiment of the present disclosure.

FIG. 11 is a schematic diagram of a structure of a control device according to an embodiment of the present disclosure. As shown in FIG. 11, the control device 900 is equipped with the foregoing channel allocation apparatus. The control device 900 is implemented by a general bus architecture.

The control device 900 includes at least one processor 901, a communication bus 902, a memory 903, and at least one communication interface 904.

Optionally, the processor 901 may be a general-purpose central processing unit (CPU), a network processor (NP), a microprocessor, or one or more integrated circuits configured to implement the solutions of the present disclosure, for example, an application-specific integrated circuit (ASIC), a programmable logic device (PLD), or a combination thereof. The PLD is a complex programmable logic device (CPLD), a field-programmable gate array (FPGA), a generic logic array (GAL), or any combination thereof.

The communication bus 902 is configured to transmit information between the foregoing components. The communication bus 902 is classified into an address bus, a data bus, a control bus, and the like. For ease of representation, only one thick line is used to represent the bus in the figure, but this does not mean that there is only one bus or only one type of bus.

Optionally, the memory 903 is a read-only memory (ROM) or another type of static storage device that can store static information and instructions. Alternatively, the memory 903 is a random access memory (RAM) or another type of dynamic storage device that can store information and instructions. Alternatively, the memory 903 is an electrically erasable programmable read-only memory (EE-PROM), a compact disc read-only memory (CD-ROM) or another optical disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer, but is not limited thereto. Optionally, the memory 903 exists independently, and is connected to the processor 901 through the communication bus 902. Optionally, the memory 903 and the processor 901 are integrated together.

The communication interface 904 is configured to communicate with another device or a communication network through any transceiver-type apparatus. The communication interface 904 includes a wired communication interface. Optionally, the communication interface 904 further includes a wireless communication interface. The wired communication interface is, for example, an Ethernet interface. The Ethernet interface is an optical interface, an electrical interface, or a combination thereof. The wireless communication interface is a wireless local area network (WLAN) interface, a cellular network communication interface, a combination thereof, or the like. The communication interface 904 may be configured to implement a function of the obtaining unit in FIG. 6.

During specific implementation, in an embodiment, the control device 900 includes a plurality of processors, for example, the processor 901 and a processor 905 shown in FIG. 11. Each of these processors is a single-core processor (single-CPU) or a multi-core processor (multi-CPU). For example, the processor 901 and the processor 905 each include two cores: a CPU 0 and a CPU 1. The processor herein is one or more devices, circuits, and/or processing cores configured to process data (for example, computer program instructions).

In some embodiments, the memory 903 is configured to store program code 99 for executing the solutions of the present disclosure, and the processor 901 executes the program code 99 stored in the memory 903. In other words, the control device 900 implements the foregoing method embodiments by using the processor 901 and the program code 99 in the memory 903.

An embodiment of the present disclosure further provides a chip, including one or more processors. A part or all of the processors are configured to read and execute a computer program stored in a memory, to perform the methods in the foregoing embodiments.

Optionally, the chip further includes the memory, and the memory and the processor are connected through a circuit or a wire. Further optionally, the chip further includes a communication interface, and the processor is connected to the communication interface. The communication interface is configured to receive data and/or information that needs to be processed. The processor obtains the data and/or information from the communication interface, processes the data and/or information, and outputs a processing result through the communication interface. The communication interface may be an input/output interface.

In some implementations, a part of the one or more processors may implement a part of the steps in the foregoing methods by using dedicated hardware. For example, processing related to a neural network model may be implemented by a dedicated neural network processor or a graphics processor.

The methods provided in embodiments of the present disclosure may be implemented by one chip, or may be implemented by a plurality of chips in collaboration.

An embodiment of the present disclosure further provides a computer storage medium. The computer storage medium is configured to store computer software instructions used by the foregoing computer device, and the computer software instructions include a program designed for execution by the computer device.

The computer device may have a function of the channel allocation apparatus in the embodiment corresponding to FIG. 10.

An embodiment of the present disclosure further provides a computer program product. The computer program product includes computer software instructions, and the computer software instructions may be loaded by a processor to implement the procedures in the methods described in the foregoing embodiments.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:

1. A channel allocation method, comprising:
   obtaining interference degrees of a plurality of access points; and
   performing partial channel allocation based on the interference degrees, wherein
   the partial channel allocation comprises: retaining an operating channel of an access point in a first access point set, and reallocating an operating channel to an access point in a second access point set, wherein the first access point set comprises an access point, in the plurality of access points, whose interference degree is lower than a target degree, and the second access point set comprises an access point, in the plurality of access points, whose interference degree reaches the target degree,
   wherein the obtaining interference degrees of the plurality of access points comprises:
   obtaining channel utilization and own channel utilization of a first access point in a plurality of first time periods, wherein the first access point is any one of the plurality of access points; and
   obtaining an interference degree of the first access point based on the channel utilization and the own channel utilization of the first access point in the plurality of first time periods,
   wherein the obtaining an interference degree of the first access point based on the channel utilization and the own channel utilization of the first access point in the plurality of first time periods comprises:
   calculating co-channel interference ratios of the first access point in the plurality of first time periods based on the channel utilization and the own channel utilization of the first access point in the plurality of first time periods, wherein each of the co-channel interference ratios is a ratio of a co-channel interference rate to the channel utilization, and the co-channel interference rate is a difference between the channel utilization and the own channel utilization; and
   obtaining the interference degree of the first access point based on the co-channel interference ratios of the first access point.

2. The method according to claim 1, wherein the performing partial channel allocation comprises:
   performing partial channel allocation when a quantity of access points, in the plurality of access points, with interference degrees reaching the target degree is less than a first threshold.

3. The method according to claim 2, further comprising:
   performing global channel allocation when a quantity of access points, in the plurality of access points, with interference degrees reaching the target degree reaches the first threshold, wherein
   the global channel allocation comprises: reallocating operating channels to the plurality of access points.

4. The method according to claim 1, wherein the obtaining an interference degree of the first access point based on the co-channel interference ratios of the first access point comprises:
   obtaining a second ratio of a quantity of first time periods in which the co-channel interference ratio is greater than a second threshold to a total quantity of the first time periods, wherein the second ratio represents the interference degree of the first access point.

5. The method according to claim 1, wherein each of the interference degrees is represented by a signal to interference ratio or a signal to interference plus noise ratio.

6. The method according to claim 1, wherein the reallocating an operating channel to an access point in a second access point set comprises:

reallocating the operating channel to the access point in the second access point set in consideration of a quantity of access points, in the second access point set, whose operating channels do not change after the reallocating of the operating channel.

7. A control device, comprising at least one memory and at least one processor; wherein the at least one processor is configured to execute a computer program or instructions stored in the at least one memory, to enable the control device to perform operations comprising:

obtaining interference degrees of a plurality of access points; and performing partial channel allocation based on the interference degrees, wherein the partial channel allocation comprises: retaining an operating channel of an access point in a first access point set, and reallocating an operating channel to an access point in a second access point set, wherein the first access point set comprises an access point, in the plurality of access points, whose interference degree is lower than a target degree, and the second access point set comprises an access point, in the plurality of access points, whose interference degree reaches the target degree, wherein the obtaining interference degrees of the plurality of access points comprises:

obtaining channel utilization and own channel utilization of a first access point in a plurality of first time periods, wherein the first access point is any one of the plurality of access points; and obtaining an interference degree of the first access point based on the channel utilization and the own channel utilization of the first access point in the plurality of first time periods, wherein the obtaining an interference degree of the first access point based on the channel utilization and the own channel utilization of the first access point in the plurality of first time periods comprises:

calculating co-channel interference ratios of the first access point in the plurality of first time periods based on the channel utilization and the own channel utilization of the first access point in the plurality of first time periods, wherein each of the co-channel interference ratios is a ratio of a co-channel interference rate to the channel utilization, and the co-channel interference rate is a difference between the channel utilization and the own channel utilization, and obtaining the interference degree of the first access point based on the co-channel interference ratios of the first access point.

8. The control device according to claim 7, wherein the performing partial channel allocation comprises:

performing partial channel allocation when a quantity of access points, in the plurality of access points, with interference degrees reaching the target degree is less than a first threshold.

9. The control device according to claim 8, wherein the obtaining an interference degree of the first access point based on the co-channel interference ratios of the first access point comprises:

obtaining a second ratio of a quantity of first time periods in which the co-channel interference ratio is greater than a second threshold to a total quantity of the first time periods, wherein the second ratio represents the interference degree of the first access point.

10. The control device according to claim 8, further comprising:

performing global channel allocation when a quantity of access points, in the plurality of access points, with interference degrees reaching the target degree reaches the first threshold, wherein the global channel allocation comprises: reallocating operating channels to the plurality of access points.

11. The control device according to claim 7, wherein each of the interference degrees is represented by a signal to interference ratio or a signal to interference plus noise ratio.

12. The control device according to claim 7, wherein the reallocating an operating channel to an access point in a second access point set comprises:

reallocating the operating channel to the access point in the second access point set in consideration of a quantity of access points, in the second access point set, whose operating channels do not change after the reallocating of the operating channel.

13. A computer-readable storage medium, storing program instructions that, when directly or indirectly executed, cause a computer to perform operations comprising:

obtaining interference degrees of a plurality of access points; and performing partial channel allocation based on the interference degrees, wherein the partial channel allocation comprises: retaining an operating channel of an access point in a first access point set, and reallocating an operating channel to an access point in a second access point set, wherein the first access point set comprises an access point, in the plurality of access points, whose interference degree is lower than a target degree, and the second access point set comprises an access point, in the plurality of access points, whose interference degree reaches the target degree, wherein the obtaining interference degrees of the plurality of access points comprises:

obtaining channel utilization and own channel utilization of a first access point in a plurality of first time periods, wherein the first access point is any one of the plurality of access points; and obtaining an interference degree of the first access point based on the channel utilization and the own channel utilization of the first access point in the plurality of first time periods, wherein the obtaining an interference degree of the first access point based on the channel utilization and the own channel utilization of the first access point in the plurality of first time periods comprises:

calculating co-channel interference ratios of the first access point in the plurality of first time periods based on the channel utilization and the own channel utilization of the first access point in the plurality of first time periods, wherein each of the co-channel interference ratios is a ratio of a co-channel interference rate to the channel utilization, and the co-channel interference rate is a difference between the channel utilization and the own channel utilization; and obtaining the interference degree of the first access point based on the co-channel interference ratios of the first access point.

14. The computer-readable storage medium according to claim 13, wherein the performing partial channel allocation comprises:

performing partial channel allocation when a quantity of access points, in the plurality of access points, with interference degrees reaching the target degree is less than a first threshold.

15. The computer-readable storage medium according to claim 14, further comprising:

performing global channel allocation when a quantity of access points, in the plurality of access points, with interference degrees reaching the target degree reaches the first threshold, wherein the global channel allocation comprises reallocating operating channels to the plurality of access points.

16. The computer-readable storage medium according to claim 13, wherein the obtaining interference degrees of a plurality of access points comprises:

obtaining channel utilization and own channel utilization of a first access point in a plurality of first time periods, wherein the first access point is any one of the plurality of access points; and obtaining an interference degree of the first access point based on the channel utilization and the own channel utilization of the first access point in the plurality of first time periods.

17. The computer-readable storage medium according to claim 16, wherein the obtaining an interference degree of the first access point based on the channel utilization and the own channel utilization of the first access point in the plurality of first time periods comprises:

calculating co-channel interference ratios of the first access point in the plurality of first time periods based on the channel utilization and the own channel utilization of the first access point in the plurality of first time periods, wherein the co-channel interference ratio is a first ratio of a co-channel interference rate to the channel utilization, and the co-channel interference rate is a difference between the channel utilization and the own channel utilization; and obtaining a second ratio of a quantity of first time periods in which the co-channel interference ratio is greater than a second threshold to a total quantity of the first time periods, wherein the second ratio represents the interference degree of the first access point.

18. The computer-readable storage medium according to claim 13, wherein the reallocating an operating channel to an access point in a second access point set comprises:

reallocating the operating channel to the access point in the second access point set in consideration of a quantity of access points, in the second access point set, whose operating channels do not change after the reallocating of the operating channel.

* * * * *